(12) United States Patent
May et al.

(10) Patent No.: US 9,189,520 B2
(45) Date of Patent: Nov. 17, 2015

(54) METHODS AND SYSTEMS FOR ONE DIMENSIONAL HETEROGENEOUS HISTOGRAMS

(71) Applicants: Norman May, Karlsruhe (DE); Guido Moerkotte, Schriesheim (DE); Alexander Boehm, Sandhausen (DE)

(72) Inventors: Norman May, Karlsruhe (DE); Guido Moerkotte, Schriesheim (DE); Alexander Boehm, Sandhausen (DE)

(73) Assignee: SAP SE, Walldorf (DE)

( * ) Notice: Subject to any disclaimer, the term of this patent is extended or adjusted under 35 U.S.C. 154(b) by 191 days.

(21) Appl. No.: 13/925,610

(22) Filed: Jun. 24, 2013

(65) Prior Publication Data
US 2014/0379693 A1 Dec. 25, 2014

(51) Int. Cl.
*G06F 17/30* (2006.01)

(52) U.S. Cl.
CPC .... *G06F 17/30463* (2013.01); *G06F 17/30469* (2013.01)

(58) Field of Classification Search
USPC .......................................... 707/713, 718, 719
See application file for complete search history.

(56) References Cited

U.S. PATENT DOCUMENTS

| 6,052,689 | A | 4/2000 | Muthukrishnan et al. | |
|---|---|---|---|---|
| 7,007,039 | B2 | 2/2006 | Chaudhuri et al. | |
| 7,342,976 | B2* | 3/2008 | McCallister | 375/269 |
| 7,392,156 | B2 | 6/2008 | Weber | |
| 7,702,699 | B2 | 4/2010 | Vazquez et al. | |
| 7,734,666 | B2 | 6/2010 | Simeonov et al. | |
| 7,877,374 | B2* | 1/2011 | Zabback et al. | 707/713 |
| 7,890,491 | B1* | 2/2011 | Simmen | 707/713 |
| 7,895,192 | B2* | 2/2011 | Mehta et al. | 707/719 |
| 8,145,669 | B2 | 3/2012 | Cormode et al. | |
| 8,179,363 | B2 | 5/2012 | Kerofsky | |
| 8,229,917 | B1* | 7/2012 | Aneas et al. | 707/713 |
| 8,356,022 | B2 | 1/2013 | Eisenreich | |
| 8,386,412 | B2 | 2/2013 | Cormode et al. | |
| 8,458,547 | B2 | 6/2013 | Viswanathan et al. | |
| 8,572,068 | B2* | 10/2013 | Graefe et al. | 707/718 |
| 2003/0084025 | A1* | 5/2003 | Zuzarte | 707/2 |
| 2004/0010488 | A1* | 1/2004 | Chaudhuri et al. | 707/3 |
| 2004/0236722 | A1* | 11/2004 | Waas et al. | 707/2 |
| 2005/0223019 | A1 | 10/2005 | Das et al. | |
| 2008/0089581 | A1 | 4/2008 | Pitie et al. | |
| 2009/0009517 | A1 | 1/2009 | Palmer | |
| 2011/0123112 | A1 | 5/2011 | Zhang | |
| 2011/0153627 | A1 | 6/2011 | Rinneberg | |
| 2013/0033389 | A1 | 2/2013 | Bendel et al. | |

OTHER PUBLICATIONS

"Extended European Search Report", European Patent Office, Nov. 21, 2014, for European Application No. 14002145.2-1951, 5pgs.

(Continued)

*Primary Examiner* — Cam-Linh Nguyen
(74) *Attorney, Agent, or Firm* — Buckley, Maschoff & Talwalkar LLC

(57) ABSTRACT

A method and system to generate cardinality estimates for at least one query execution plan for a query using a histogram, the cardinality estimation being constrained by a q-error that is a factor by which the estimate deviates, at most, from a true value of the cardinality and a threshold value which the cardinality does not exceed; use the cardinality estimation to determine an optimal query plan for executing the query; and produce an output of the optimal query plan.

18 Claims, 7 Drawing Sheets

---

1000

GENERATE CARDINALITY ESTIMATES FOR AT LEAST ONE QUERY EXECUTION PLAN, THE CARDINALITY ESTIMATION BEING CONSTRAINED BY A Q-ERROR THAT IS A FACTOR BY WHICH THE ESTIMATE DEVIATES, AT MOST, FROM A TRUE VALUE OF THE CARDINALITY AND A THRESHOLD VALUE WHICH THE CARDINALITY DOES NOT EXCEED
1005

↓

DETERMINE AN OPTIMAL QUERY PLAN FOR EXECUTING THE QUERY USING THE CARDINALITY ESTIMATION
1010

↓

PRODUCE AN OUTPUT OF THE OPTIMAL QUERY PLAN
1015

(56) References Cited

OTHER PUBLICATIONS

Kanne, Carl-Christian et al., "Histograms Reloaded: The Merits of Bucket Diversity", Proceedings of the 2010 International Conference on Management of Data, SIGMOD '10, Jun. 6, 2010, XP055152091, DOI: 10.1145/1807167.1807239, ISBN: 978-1-45-030032-2, (pp. 663-673, 12 total pages).

Moerkotte, Guido et al., "Exploiting Ordered Dictionaries to Efficiently Construct Histograms with Q-Error Guarantees in SPA HANA", Proceedings of the 2014 ACM SIGMOD International Conference on Management of Data, SIGMOD '14, Jun. 18, 2014, XP055152095, DOI: 10.1145/2588555.2595629, ISBN: 978-1-45-032376-5, (pp. 361-372, 12 total pages).

Moerkotte, Guido et al., "Preventing Bad Plans by Bounding the Impact of Cardinality Estimation Errors", Proceedings of the VLDB Endowment, vol. 2, No. 1, Aug. 1, 2009, XP055152194, DOI: 10.14778/1687627.1687738, ISSN: 2150-8097, (pp. 982-993, 12 total pages).

* cited by examiner

| #Bits | Base | Largest compressable number | q-Error |
|---|---|---:|---:|
| 4 | 2.5 | 372529 | 1.58 |
| 4 | 2.6 | 645099 | 1.61 |
| 4 | 2.7 | 1094189 | 1.64 |
| 5 | 1.7 | 8193465 | 1.30 |
| 5 | 1.8 | 45517159 | 1.34 |
| 5 | 1.9 | 230466617 | 1.38 |
| 6 | 1.2 | 81140 | 1.10 |
| 6 | 1.3 | 11600797 | 1.14 |
| 6 | 1.4 | 1147990282 | 1.18 |
| 7 | 1.1 | 164239 | 1.05 |
| 7 | 1.2 | 9480625727 | 1.10 |
| 8 | 1.1 | 32639389743 | 1.05 |

*FIG. 3*

| k | max q-error observed | max q-error theoretical ($\sqrt{1+2^{1-k}}$) |
|---|---:|---:|
| 1 | 1.5 | 1.41 |
| 2 | 1.25 | 1.22 |
| 3 | 1.13 | 1.12 |
| 4 | 1.07 | 1.06 |
| 5 | 1.036 | 1.03 |
| 6 | 1.018 | 1.016 |
| 7 | 1.0091 | 1.0078 |
| 8 | 1.0045 | 1.0039 |
| 9 | 1.0023 | 1.00195 |
| 10 | 1.0011 | 1.00098 |
| 11 | 1.00056 | 1.00048 |
| 12 | 1.00027 | 1.00024 |

*FIG. 4*

| Name | Total | | Bucklets | | | |
|---|---|---|---|---|---|---|
| | #Bits | Compression | # | #Bits | Compression | Base |
| QC16T8x6 | 16 | bq-compr. | 8 | 6 | q-compr. | 1.2-1.4 |
| QC8x8 | 0 | --- | 8 | 8 | q-compr. | 1.1 |
| QC16x4 | 0 | --- | 16 | 4 | q-compr. | 2.5-2.7 |
| QC8T8x7 | 8 | q-comp. | 8 | 7 | q-compr. | 1.1-1.2 |
| BQC8x8 | 0 | --- | 8 | 8 | bq-compr. | --- |

METHODS AND SYSTEMS FOR ONE DIMENSIONAL HETEROGENEOUS HISTOGRAMS

FIELD

Some embodiments relate to executing and optimizing queries executed by database management systems. In particular, some embodiments concern methods and systems for optimizing the queries by providing cardinality estimations with guaranteed bounded error in a database management system in an efficient and effective manner. In some aspects, the data structures used to derive the estimates exploit discrete dense domains for faster histogram construction.

BACKGROUND

Query optimization depends in large part on efficient and accurate cardinality estimates of intermediate results and the plan for the order of a sequence or set of operators representative of a query. In some aspects, the order of the operators to implement the query may be determined with relative ease, particularly as compared to the process of accurately determining a cardinality estimate.

Various methods have been previously proposed for determining cardinality estimates. However, a number of the previous proposals may result in unbounded estimation errors. Also, since the building of a histogram typically involves the accessing of data via a data scan the manner in which the data is stored may impact the efficiency of the histogram construction.

BRIEF DESCRIPTION OF THE DRAWINGS

FIGS. 3-5 are each illustrative tabular listings of various parameters and corresponding values, according to some embodiments.

FIG. 6 is a depiction of an illustrative array, in accordance with some embodiments herein.

DETAILED DESCRIPTION

The following description is provided to enable any person in the art to make and use the described embodiments and sets forth the best mode contemplated for carrying out some embodiments. Various modifications, however, will remain readily apparent to those in the art.

In some aspects, histograms may be used to provide cardinality estimates. A histogram partitions the (active) domain of an attribute into buckets, where each bucket stores the number of distinct values it contains (d) and their cumulated frequency (fc).

In some embodiments herein, a q-error is used as an error metric for the cardinality estimation provided by the histograms. As used herein, the q-error is the factor by which the estimate deviates from the true value. In some embodiments herein, the factor between the costs of a query plan generated due to cardinality estimation errors and an optimal plan may be bound by a q-error less than a power of four (4). For example, some embodiments provide a histogram that guarantees if the estimation error is at most a factor of two off, then the error of the estimated cost for a query will be at most $2^4$ off, in all cases. In some embodiments herein, a cardinality estimate is provided that includes an upper bound of error. Accordingly, such a histogram may be used to guarantee the preciseness of a query optimization using the histogram.

In some aspects, embodiments herein may, at least, simplify the optimization of a query (in a plan generator) and/or provide a cardinality estimation guarantee. For example, in an instance a query optimizer generates a first plan with an accurate cardinality estimate and thus a histogram with a guaranteed maximum error of "x", then the optimizer may efficiently determine that a second (or any other) plan that does not provide better guarantee that the factor "x" should not be chosen or recommended.

In a general case, a range of values to be evaluated may include gaps where there are no values in a portion of the range. In some DBMS, a "dictionary compression" may be used that maps each unique value that it is stored to an integer value. This type of mapping may be referred to as "dense" mapping since it may result in no gaps since each unique stored value is mapped to or associated with a consecutive integer value. In this manner, the compressed representation of the DBMS does not include gaps. One type of DBMS that may employ "dictionary compression" is the HANA system by SAP AG. The HANA system allows, for example, smaller histogram representation.

Figure 1:
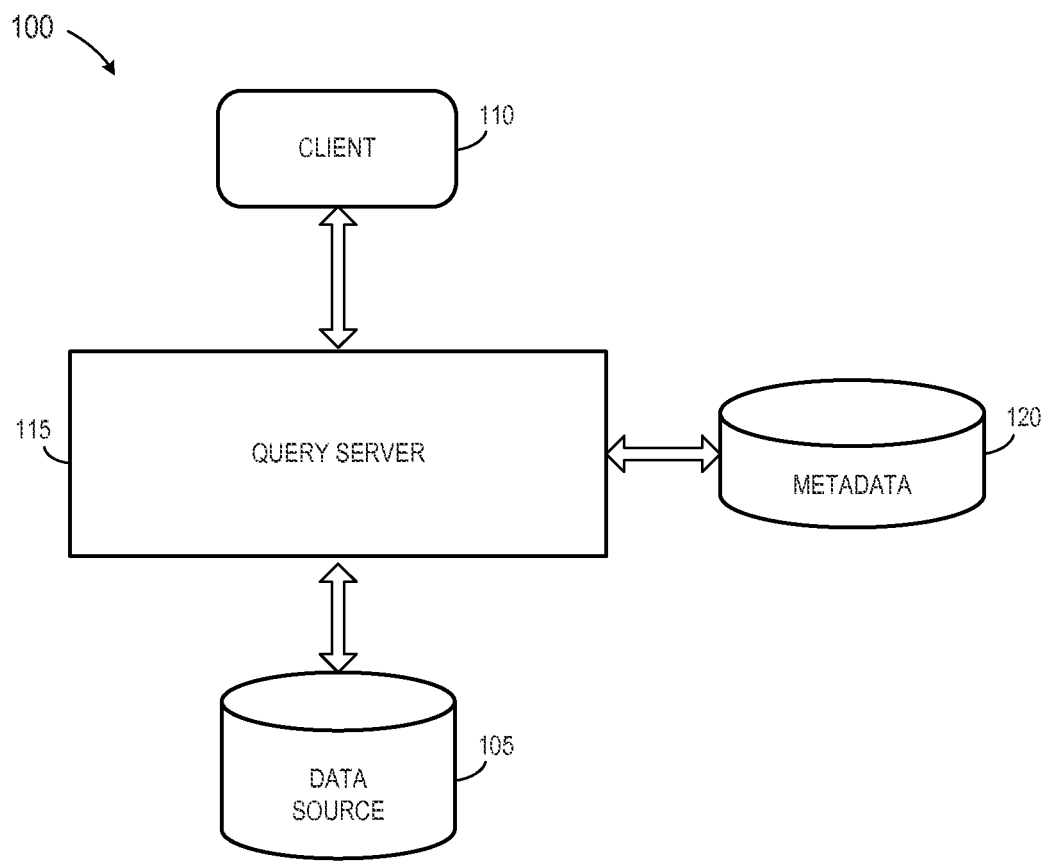
FIG. 1 is an illustrative depiction of a system architecture, according to some embodiments.

FIG. 1 is a block diagram of system 100 according to some embodiments. System 100 includes data source 105, client 110, and query server 1115. Data source 105 may comprise any query-responsive data source or sources that are or become known, including but not limited to a structured-query language (SQL) relational database management system. Data source 105 may comprise a relational database, a multi-dimensional database, an eXtendable Markup Language (XML) document, or any other data storage system storing structured and/or unstructured data. The data of data source 105 may be distributed among several relational databases, multi-dimensional databases, and/or other data sources. Embodiments are not limited to any number or types of data sources. For example, data source 105 may comprise one or more OnLine Analytical Processing (OLAP) databases, spreadsheets, text documents, presentations, etc.

In some embodiments, data source 105 is implemented in Random Access Memory (e.g., cache memory for storing recently-used data) and one or more fixed disks (e.g., persistent memory for storing their respective portions of the full database). Alternatively, data source 105 may implement an "in-memory" database, in which volatile (e.g., non-disk-based) memory (e.g., Random Access Memory) is used both for cache memory and for storing its entire respective portion of the full database. In some embodiments, the data of data source 105 may comprise one or more of conventional tabular data, row-based data stored in row format, column-based data stored in columnar format, and object-based data. Data source 105 may also or alternatively support multi-tenancy by providing multiple logical database systems which are programmatically isolated from one another. Moreover, the data of data source 105 may be indexed and/or selectively replicated in an index to allow fast searching and retrieval thereof.

Metadata 120 may provide information regarding the structure, relationships and meaning of the data stored within data source 105. Metadata 120 may also include data defining views on the stored data, and queries that may be executed upon the stored data. Metadata 120 may be generated by a database administrator.

Query server 115 generally provides data of data source 110 to reporting clients, such as client 110, in response to instructions (e.g., SQL statements) received therefrom. In some embodiments, query server 115 receives an instruction from client 110. Query server 115 generates an execution plan based on the instruction and on metadata 140. The execution plan is forwarded to data source 105, which executes the plan and returns a dataset based on the SQL script. Query server 115 then returns the dataset to client 110. Embodiments are not limited thereto.

Client 110 may comprise one or more devices executing program code of a software application for presenting user interfaces to allow interaction with query server 115. Presentation of a user interface may comprise any degree or type of rendering, depending on the type of user interface code generated by query server 115. For example, client 110 may execute a Web Browser to receive a Web page (e.g., in HTML format) from query server 115, and may render and present the Web page according to known protocols. Client 110 may also or alternatively present user interfaces by executing a standalone executable file (e.g., an .exe file) or code (e.g., a JAVA applet) within a virtual machine.

Figure 2:
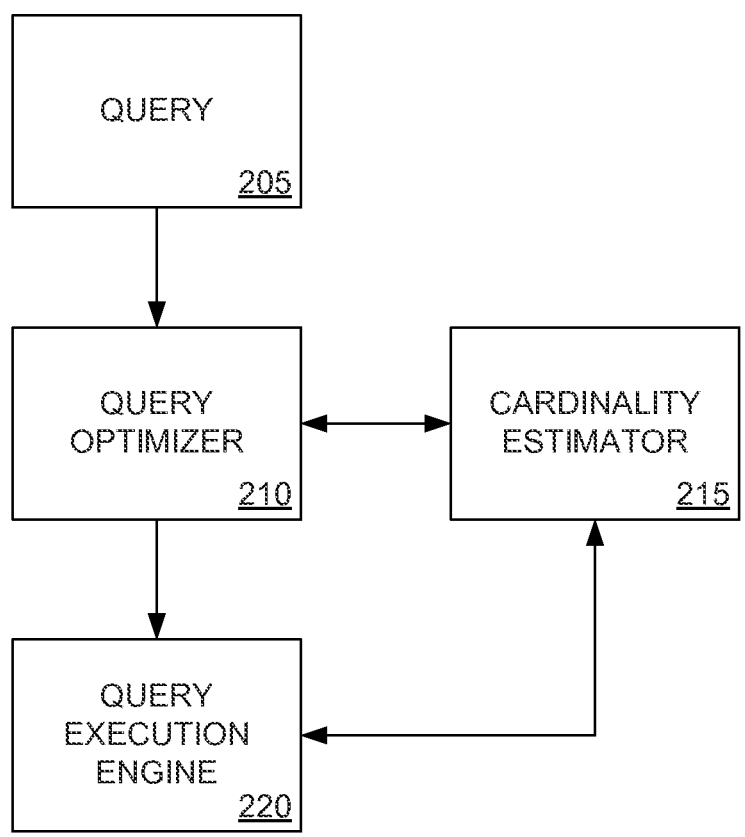
FIG. 2 is flow diagram of a process according to some embodiments.

FIG. 2 is a functional flow diagram for a process or service of a database management system (DBMS) 200. DBMS may include or incorporate aspects of the system of FIG. 1, including for example, data source 105, query server 115, and metadata 120. A query 205 may be sent to, obtained by, or otherwise received by a cost based query optimizer 210. Optimizer 210 may be implemented by a query server 115 or other server providing the services and functionality of optimizer 210. Optimizer 210 may operate to produce a query execution plan for executing the query request 205 in a "cost effective" manner. In some aspects, query optimizer 210 and (potentially) query execution engine 220 interact with a cardinality estimator 215. In some aspects, query optimizer 210 may mainly retrieve data from cardinality estimator 215, while query execution engine 220 may have a bi-directional data exchange relationship with cardinality estimator 215. Cardinality estimator 215 may be used by the optimizer to determine or calculate cardinality estimates. Cardinality estimator 215 may interact with query execution engine 220 because the query execution engine (or data source) provides the raw data to generate statistics. In some cases, the cardinality estimates may also be used for approximate query processing. The query plan generated by query optimizer 210 may be forwarded to and executed by a query execution engine 220 of the DBMS in a runtime environment(not shown). In some instances (e.g., special cases where a cardinality estimation may be too costly), query optimizer 210 may not interact with cardinality estimator 215. In some embodiments, a query server such as, for example, query server 115 may comprise cardinality estimator 215 or the functionality thereof, while in some other or alternative embodiments cardinality estimator 215 may be a component, system, subsystem, or service that is distinct from the query server.

Regarding the query optimization and the assessment of the query execution plans, cardinality estimates provide a mechanism to estimate the size of intermediate results. A problem may occur if the cardinality estimate for some query is $\hat{f} \geq 1$ and the true cardinality is zero. There is an issue since an estimate of zero is undesirable because it leads to query simplifications that may be wrong or in re-orderings of plan operators that may not be appropriate. To address this issue, during query optimization time, building blocks and access paths are executed until the first tuple has been delivered. From then on, it is known for sure, whether the result will be empty or not. If a tuple is delivered, it is buffered in order to avoid its recalculation at a runtime. The overhead of this method should therefore be low.

For example, assume that a system or method is to buffer more than one tuple (e.g., 1000). Then, if there are less than 1000 qualifying tuples, the exact number of tuples will be known after fetching them. If the evaluation of the building block has to be halted because the buffer is full, then we know that there will be ≥ 1000 qualifying tuples. Here, we denote by $\theta_{buf}$ the number of tuples that will or can be buffered.

However, before a building block or access paths can be evaluated an optimal execution plan has to be determined, which in turn requires cardinality estimates. It is noted that cardinality estimates may be imprecise, so as long as they do not influence the decisions of the query optimizer too adversely. That is, as long as the query optimizer produces the best plan, any (sufficient) estimate is fine.

For example, consider the decision whether to exploit an index or not. Assume an index is better than a scan if less than 10% of the tuples qualify (as is typical). If the relation has 10,000 tuples, then the threshold is 1000 tuples. Thus, assume that for a given range query both the estimate and the true value do not exceed 500. If this is the case, then no matter what the estimate is, we should use the index. Note that the q-error can be 500 (e.g., the estimate is 1 and the true value is 500). Even so, such an estimate does not have any adverse influence on the index or scan decision. The important characteristic here is that the estimate has to be precise around 1000. For a given relation and one of its indices, we denote by $\theta_{idx}$ the number of tuples that, if exceeded make a table scan more efficient than the index scan.

Combining the two thresholds introduced above (i.e., $\theta_{buf}$ and $\theta_{idx}$) and assuming a desired maximal q-error of q, define $\theta = \min(\theta_{buf}-1, (1/q)\theta_{idx})$; and assuming $\hat{f}$ is an estimate for the true cardinality f. Further assume that if $\hat{f}$ or f exceeds $\Theta$, then $\|\hat{f}/f\|_Q \leq q$.

Now proceeding through the optimizer in a first step, we denote our building blocks and access paths, which requires a decision on index usage. Clearly, the estimate will be precise above $(1/q)\theta_{idx}$, which includes the critical part. After evaluating a building block or access path, we have precise cardinality estimates if fewer than $\theta_{buf}$ tuples are retrieved. Otherwise, our estimate will obey the given q-error. Thus, we are as precise as necessary under all circumstances.

Based on the foregoing, we now introduce the notion of $\Theta$, q-acceptability. Let $f \geq 0$ be a number; $\hat{f} \geq 0$ be an estimate for f; $q \geq 1$; and $\Theta \geq 1$ be numbers. We note that $\hat{f}$ is $\Theta$, q-acceptable if:
1. $f \leq \Theta \wedge \hat{f} \leq \Theta$; or
2. $\|\hat{f}/f\|_Q \leq q$.

Let R be a relation and A be one of its attributes. Let $\Pi_A^D(R) = \{x_1, \ldots, x_d\}$ with $x_i \leq x_{i+1}$. Denote by $f_i$ the frequency of $x_i$ and by $f^+(c_1, c_2) := \Sigma_{c_1 \leq x < c_2} f_i$ the cumulated frequency. Let $\hat{f}^+(x, y)$ be an estimation function for $f^+$. Here, we state that $\hat{f}^+$ is $\Theta$, q-acceptable, if for all $x_1 \leq c_1 \leq c_2 \leq x_d$ the estimate $\hat{f}^+(c_1, c_2)$ is $\Theta$, q-acceptable. In other words, if the cardinality is below $\Theta$, then we do not care how large it really is. This is because, for example, the query execution will be fast anyway, even if we pick the wrong (i.e., not the best) plan.

Having established constraints or the conditions for the desired cardinality estimates, we now turn our attention to testing $\Theta$, q-acceptability for histogram buckets. Let R be a relation and A be one of its attributes. We assume that $\Pi_A^D(R) = \{x_1, \ldots, x_d\}$, where $d := \Pi_A^D(R)$ and $x_i \leq x_j$ for all $1 \leq i \leq j \leq d$.

Here, we only treat range queries since exact match queries are simpler than range queries and distinct value queries are similar. We also assume right-open bucket boundaries and range queries of the form [a, b[.

Testing $\Theta$, q-acceptability for a given bucket for a continuous domain directly is impossible since it would involve testing $\Theta$, q-acceptability of $\hat{f}^+(c_1, c_2)$ for all $c_1, c_2$ within the bucket. However, we note that a test quadratic in the number of distinct values in the bucket suffices.

Accordingly, let $c_1, c_2$ be a query interval and assume i; j are chosen such that $[x_i, x_j] \subseteq [c_1, c_2] \subset [x_{i-1}, x_{j+1}]$. Since there is no distinct value between $x_i$ and $x_{i-1}$ and between $x_j$ and $x_{j+1}$, we have that $f^+(c_1, c_2) = f^+(x_{i-1}, x_{j+1}) < f^+(x_{j-1}, x_{j+1})$.

Further, assume the following conditions hold:
1. $\hat{f}^+$ is monotonic;
2. 
$$\left\| \frac{\hat{f}^+(x_i, x_j)}{f^+(c_1, c_2)} \right\|_Q \leq q$$

3.
$$\left\| \frac{\hat{f}^+(x_{i-1}, x_{j+1})}{f^+(c_1, c_2)} \right\|_Q \leq q$$

Since $\hat{f}^+(x_i, x_j) = \hat{f}^+(c_1, c_2) \leq \hat{f}^+(x_{i-1}, x_{j+1})$, we then have $$\left\| \frac{\hat{f}^+(c_1, c_2)}{f^+(c_1, c_2)} \right\|_Q \leq q.$$

Exploiting this fact, we can develop the following quadratic test for some given $\Theta$ and q. If, for all i; j such that $x_i$ and $x_j$ are in the bucket, we have that, $$\hat{f}^+(x_{i-1}, x_{j+1}) \leq \Theta \wedge f^+(x_{i-1}, x_{j+1}) \leq \Theta$$

or $$\left\| \frac{\hat{f}^+(x_i, x_j)}{f^+(x_i, x_j)} \right\|_Q \leq q \wedge \left\| \frac{\hat{f}^+(x_{i-1}, x_{j+1})}{f^+(x_i, x_j)} \right\|_Q \leq q$$

then the bucket is $\Theta$, q-acceptable.

Still, after discretization discussed above to determine bucket boundaries, the number of tests is quadratic in the number of distinct values contained in a bucket. However, the number of tests needed can be further restricted for monotonic and additive estimators $\hat{f}^+$. For a given fixed $\Theta$ and for any i' ($1 < i < d$), we define i' to be the index such that:
1. $f^+(x_i, x_{i'}) \leq \Theta$
2. $\hat{f}^+(x_i, x_{i'}) \leq \Theta$
3. $f^+(x_i, x_{i'+1}) > \Theta$ or $\hat{f}^+(x_i, x_{i'+1}) > \Theta$ That is, if all real boundary values are less than $\Theta$, then the estimate values are also less than $\Theta$; and if the value is larger than $\Theta$, then check for the q-error of the boundary being considered.

This index i' can be found by binary search (i.e., subtest). For example, for a given L, assume that for all l with $1 \leq l \leq L$, $$\|\hat{f}^+(x_i, x_{i'+l})/f^+(x_i, x_{i'+l})\|_Q \leq q$$

and $f^+(x_i, x_{i'+L}) \geq k\Theta$ and
$\hat{f}^+(x_i, x_{i'+L}) \geq k\Theta$ That is, we stop after L tests.

It will now be shown that the bucket is $\Theta$, $$\left(q + \frac{1}{k}\right) -$$

acceptable. Consider the range query $[x_i, x_j[$. If $\hat{f}^+(x_i, x_j) \leq k\Theta$, then it is $\Theta$, q-acceptable for $f^+(x_i, x_j)$. Otherwise, we can find $i_1, \ldots, i_m$ such that
$x_i = x_{i_1}$ and
$x_j = x_{i_m}$.

Also, we can achieve that (a)
$\forall i_j < m-1 \ f^+(x_{i_j}, x_{i_{j+1}}) \geq k\Theta$ and
$f^+(x_{i_{m-1}}, x_{i_m}) < \Theta$ or (b)
$\forall i_j < m-1 \ \hat{f}^+(x_{i_j}, x_{i_{j+1}}) \geq k\Theta$ and
$\hat{f}^+(x_{i_{m-1}}, x_{i_m}) < \Theta$ In a worst case, we have m=3.

Consider the following cases. For a Case 1,
$f^+(x_i, x_j) \leq \hat{f}^+(x_i, x_j)$ implies:

$$\left\| \frac{\hat{f}^+(x_i, x_j)}{f^+(x_i, x_j)} \right\|_Q =$$

$$\frac{\hat{f}^+(x_i, x_j)}{f^+(x_i, x_j)} = \frac{\hat{f}^+(x_{i_1}, x_{i_{l-1}}) + \hat{f}^+(x_{i_l}, x_j)}{f^+(x_{i_1}, x_{i_{l-1}}) + f^+(x_{i_{l-1}}, x_{i_l})} \leq \frac{qf^+(x_{i_1}, x_{i_{l-1}}) + \Theta}{f^+(x_{i_1}, x_{i_{l-1}}) + 1} \leq$$

$$\frac{qf^+(x_{i_1}, x_{i_{l-1}}) + \Theta}{f^+(x_{i_1}, x_{i_{l-1}})} \leq q + \frac{\Theta}{f^+(x_{i_1}, x_{i_{l-1}})} \leq q + \frac{\Theta}{k\Theta} \leq q + \frac{1}{k}$$

And, for a Case 2,
$\hat{f}^+(x_i, x_j) \leq f^+(x_i, x_j)$ implies:

$$\left\| \frac{\hat{f}^+(x_i, x_j)}{f^+(x_i, x_j)} \right\|_Q =$$

$$\frac{f^+(x_i, x_j)}{\hat{f}^+(x_i, x_j)} = \frac{f^+(x_{i_1}, x_{i_{l-1}}) + f^+(x_{i_l}, x_j)}{\hat{f}^+(x_{i_1}, x_{i_{l-1}}) + \hat{f}^+(x_{i_{l-1}}, x_{i_l})} \leq \frac{f^+(x_{i_1}, x_{i_{l-1}}) + \Theta}{\hat{f}^+(x_{i_1}, x_{i_{l-1}}) + 1} \leq$$

$$\frac{f^+(x_{i_1}, x_{i_{l-1}}) + \Theta}{\hat{f}^+(x_{i_1}, x_{i_{l-1}})} \leq q + \frac{\Theta}{\hat{f}^+(x_{i_1}, x_{i_{l-1}})} \leq q + \frac{1}{k}$$

Thus, it is seen that some accuracy may be traded in for gains in performance when testing the $\Theta$, q—acceptability of some bucket(s). As the foregoing demonstrates, we may only need to check the intervals for the values that actually occur, as opposed to checking every possible value in the intervals.

We have disclosed herein a quadratic test and other subtest to test for the $\Theta$, q—acceptability of histogram bucket(s). Additionally, it is noted that in embodiments herein, if the domain of the histogram attribute is discrete and every domain value within the bucket has a frequency larger than zero, then the bucket is "dense". The buckets are always dense if dictionaries are used as is the case for in-memory database systems such as, for example, HANA DB, that use dictionary compression in the storage of data. In the case of a dense bucket, $\Theta$, q-acceptability is implied by either of the following conditions:

1. The cumulated frequency of the bucket is less than or equal to Θ, or
2.

$$\frac{\max_i f_i}{\min_i f_i} \leq q^2.$$

The evaluation for dense buckets is computationally inexpensive and fast. The first condition also holds for non-dense buckets. The last condition only holds if we use our flexibility concerning the a in our approximation function.

If we use $\hat{f}_{avg}^+$, we need to exchange it against:

$$q\bar{f} \geq \max_i f_i \wedge (1/q)\bar{f} \leq \min_i f_i$$

where $\bar{f}$ is the average frequency of the bucket.

If this cheap pretest fails, then the subtest or the quadratic test or the discussed hereinabove may be applied. Accordingly, in some embodiments an order of testing for the Θ, q-acceptability of buckets may include (1) a pretest for dense buckets, (2) a subtests that meets certain conditions, and a quadratic test. In some aspects, the order of the tests applied may increase in complexity and computation costs.

Again, let R be a relation and A be some of its attributes with $\Pi_A^D = \{x_1, \ldots, x_d\}$, where $d := |\Pi_A^D(R)|$ and $x_i \leq x_j$ for $1 \leq i \leq j \leq d$. In general, Θ, q-acceptability does not carry over from buckets to histograms. For example, consider a histogram in which each bucket has the true cumulated frequency Θ and the estimate for each bucket is 1. Then, the estimate for a range query comprising n buckets is n and the true value is nΘ. Clearly, the histogram is not Θ, q-acceptable if q<Θ.

Letting H be a histogram, k≥2 be a number, and considering two neighbored buckets B1 and B2 spanning the intervals $[b_i, b_{i+1}[$ for i=0, 1, applicants have realized that if both buckets B1 and B2 are Θ, q-acceptable, then the histogram is kΘ, $$q + \frac{q}{k-1} -$$

acceptable.

In some embodiments, if we let H be a histogram, consider n≥3 consecutive buckets $B_i$ in H spanning the intervals $[b_i, b_{i+1}[$ for i=0, ..., n, and let k≥3, then it has been realized that if every estimate for a range query spanning a whole bucket is q-acceptable and every bucket $B_i$ is Θ, q-acceptable, then the histogram is kΘ, $$q + \frac{2q}{k-2} -$$

acceptable. It is noted that here k is a multiplication factor.

In case the estimates for a whole bucket are precise, e.g., if we use $\hat{f}_{avg}^+$, we can refine the bounds. Letting H be a histogram, considering n≥3 consecutive buckets $B_i$ in H spanning the intervals $[b_i, b_{i+1}[$ for i=0, ..., n, and k≥3 is a number, then it has been realized that if every estimate for a range query spanning a whole bucket is 1-acceptable and every bucket $B_i$ is Θ, q-acceptable then the histogram is kΘ,q'-acceptable, where $$q' := \frac{2}{k-2}q + 1.$$

In some embodiments, as users may desire or even require a maximum size for the constructed histogram, q and theta (Θ) may be modified. With higher q and theta, it becomes possible to generate histograms that potentially consume less space. For example, we may iteratively increase q by a factor of 1.1 and theta by a factor of two until the size of the histogram is smaller than the requested maximum size.

In some embodiments, the values stored in the buckets of a histogram may be represented in a compressed manner. The goal of q-compression is to approximate a number x≥1 with a small q-error. Given some b>0, let x be some number in the interval $[b^{2l}, b^{2(l+1)}]$. If we approximate x by $b^{2l+1}$ then $\|b^{2l+1}/x\|Q \leq b$. Let $x_{max}$ be the largest number to be compressed. If $x_{max} \leq b^{2(k+1)}$ for some k is the maximal occurring number, we can approximate any x in $[1, x_{max}]$ with $\lceil \log_2(k) \rceil$ bits obeying a maximal q-error of b. We can extend q-compression to allow for the compression of 0. In some embodiments, we can use the base b instead of $b^2$ as above. Thus, the error is at most $\sqrt{b}$.

As an example, let b=1.1 and assume 8 bits are used to store a number. Then, since $1.1^{254} \approx 32.6 * 10^9$, even huge numbers can be approximated with a small q-error of, at most, $\sqrt{1.1} = 1.0488$. This and other additional examples are given in table illustrated in FIG. 3.

In some aspects, there may exist a small disadvantage of q-compression with a general base. Although calculating the logarithm is quite cheap since, typically, machine instructions to do so exist, calculating the power during decompression is quite expensive. In some observed embodiments, compression takes roughly 54 ns whereas decompression takes about 158 ns. In the context of cardinality estimations, decompression is used far more often than compression. Thus, an alternative to q-compression is introduced called binary q-compression.

In some embodiments, a form of compression referred to herein as binary q-compression is proposed. For example, let x be the number we want to compress. If we use the base b=2 then $\lceil \log_2(x) \rceil = k$ where k is the index of the highest bit set. This calculation can be done rather efficiently by a machine instruction and gives a maximum q-error of $\sqrt{2}$. An error below this may be had by remembering not only the highest bit set but the k highest bits set. Additionally, the position of them (their shift) may be stored in s bits. Pseudocode for binary Q-compression is provided below, where the scheme is extended to allow for the compression of zero.

```
qcompress2(x, k, s)
    if 2^s>x
    then
        bits=x
        shift=0
    else
        shift=index-of-highest-bit-set(x)-k+1;
        bits=(x>>shift)
    return (bits<<shift)|shift
gdecompress2(y, k, s)
    shift=y & (2^s-1)
    bits=y >>shift
    x=bits<<shift
    -assume C=(int) ((sqrt((double) 2.0)-1.0)*4*(1<<30))
    x|=(C>>(32-shift))
    return x
```

The q-middle of $2^n$ and $2^{n-1}-1$ is $\sqrt{2^n*(2^{n+1}-1)}$. This is the estimate that should be returned for n. However, it is not desirable to compute the square root during decompression since this operation is too expensive of a computation. With a little more calculation we see that, $$\sqrt{2^n*(2^{n+1}-1)} \approx \sqrt{2^n*(2^{n+1})}$$
$$\approx \sqrt{2^{2n}*2}$$
$$\approx \sqrt{2}*2^n$$
$$\approx 2^n + (\sqrt{2}-1)*2^n$$

The second part can be calculated by a constant ($\sqrt{2}-$) shifted by n to the left. The pseudocode above gives the calculation of this constant C in C. The best theoretical q-error achievable with storing k bits is $\sqrt{1+2^{1-k}}$. With the fast approximation herein, results very close to the theoretical best are possible, as the table in FIG. 4 demonstrates. The observed maximal q-error column was obtained experimentally. The deviation from the observed maximal q-error to the theoretical maximal q-error is due to the fact that only a small portion of the digits of C are used. Further, compression (2.7 ns) and decompression (2.8 ns) are fast using the proposed calculation.

In some embodiments, the q-compressed numbers may be incrementally updated. For binary q-compressed numbers, the incrementing procedure may be defined as follows:
RandomIncrement(int& c)
//c: the counter
let $\delta$ be a binary random variable which takes
value 1 with probability $2^{-c}$ and
value 0 with probability $1-2^{-c}$.
c+=$\delta$ To go to an arbitrary base, we have to modify the random variable $\delta$ such that it takes the value 1 with probability $a^{-c}$ and 0 with probability $1-a^{-c}$.

Figures 5, 6:
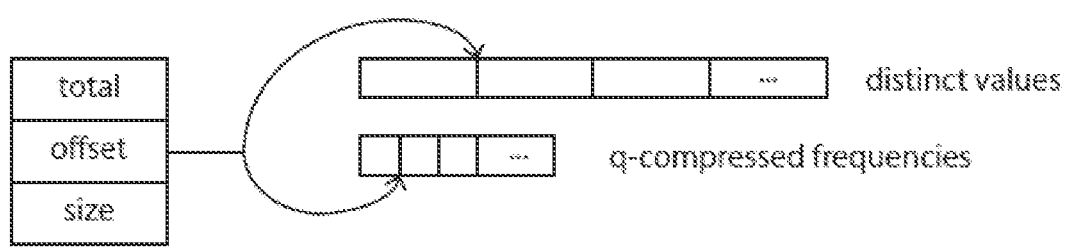

Using q-compression or binary q-compression, several cumulated frequencies may be stored in 64 bits and possibly, additionally, a total to make estimates for query ranges that span many buckets cheaper. Some useful combinations are given in FIG. 5. As indicated in FIG. 5, a smaller base leads to smaller q-error but the largest number compressible also becomes smaller. Therefore, a different basis should be used, as appropriate for the particular bucket type. Which base is actually used can be indicated in the bucket's header.

Many attribute distributions may contain parts that are not approximable. For these parts, we need two additional bucket types. The first bucket type is for dense buckets, i.e., the attribute's domain is discrete and all possible values between the bucket boundaries have a frequency larger than zero. In this case, it suffices to store the frequencies of each distinct value contained in the bucket. In some embodiments, q-compression with 4 bits is used to store the frequencies. This results in a QCRawDense bucket.

In case the bucket is non-dense, the distinct values are additionally stored. In this case, there are two arrays, one array with the distinct values and the other array consisting of 4 bits per entry to store the q-compressed frequencies. This results in a QCRawNonDense bucket. This bucket type is illustrated in FIG. 6. The 64 bit header may include a 32 bit offset into two aligned arrays, where one contains the distinct values, the other the q-compressed frequencies. Additionally, size (16 bit) determines the number of distinct values and total (16 bit) contains the binary q-compressed cumulated frequency.

Four level trees have been proposed to represent bucket indices. The basic idea is to divide a bucket into eight sub-buckets (called bucklets) of equal width. Consider the following sample bucket:

| $x_i$ | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| $f_i$ | 7 | 5 | 18 | 0 | 6 | 10 | 0 | 6 | 0 | 6 | 9 | 5 | 13 | 0 | 8 | 7 |

This bucket is divided into 8 bucklets of width 16/8=2. Every bucklet $\tau_{i,8}$ summarizes the values in bucket i, $1 \le i \le 8$. The next higher level of the four level tree contains four values $\tau_{i,4}$ ($1 \le i \le 4$) summing the frequencies in the i-th quarter of the bucket. Thus, $\tau_{i,4} = \tau_{2i-1,8} + \tau_{2i,8}$ for $1 \le i \le 4$. The third level of the four level tree defines the values $\tau_{i,2}$ for i=1, 2 summing up the frequencies in each half of the bucket. The last level, $\tau_{1,1}$ contains the sum of all frequencies $f_i$ in the bucket. This scheme is illustrated in FIG. 7 and is formally defined as, $$\tau_{i,2^k} := \tau_{2i-1,2^{k+1}} + \tau_{2i,2^{k+1}}$$

for k=0, ..., 3.

Figure 7:
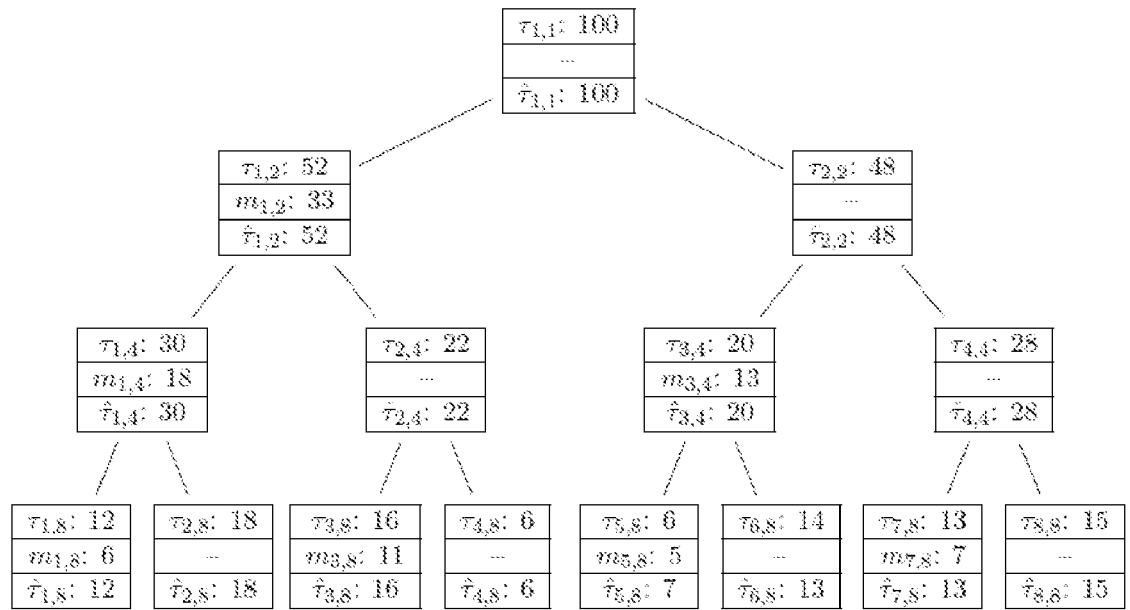
FIGS. 7 and 8 are illustrative depictions of tree-like representative structures, in accordance with some embodiments herein.

The four level tree in FIG. 7 is compressed into 64 bits as follows $\tau_{1,1}$ is stored in the first 32 bits. Next, the $\tau_{j,2^k}$ for k>0 are only stored if j is odd. For even j=2i, $\tau_{2i,2^k+1}$ can be calculated given $\tau_{i,2^k}$:

$$\tau_{2i,2^{k+1}} := \tau_{i,2^k} - \tau_{2i-1,2^{k+1}}$$

for k=1, ..., 3. Further, since 7 numbers have to be compressed into 32 bits, only an approximation thereof is stored. The number of bits $b_k$ used to store the approximation of some $\tau_{2i-1,2^{k+1}}$ decreases from top to bottom:

| k | 0 | 1 | 2 | 3 |
|---|---|---|---|---|
| $b_k$ | 32 | 6 | 5 | 4 |

The intention is that if a mistake is made at a higher level, all lower levels are affected. Thus, we want to be precise at higher levels. Hence, in some embodiments herein more bits are invested at the higher levels.

Instead of storing $\tau_{2i-1,2^{k+1}}$ directly, the ratio $\tau_{2i-1,2^{k+1}}/\tau_{i,2^k}$ is approximated using $b_k$ bits:

$$m_{2i-1,2^{k+1}} := \text{round}\left(\frac{\tau_{2i-1,2^{k+1}}}{\tau_{i,2^k}}(2^{b_k}-1)\right). \quad (1)$$

The 7 $m_{i,j}$ values are stored in the second 32 bits:

| $m_{1,2}$ | $m_{1,4}$ | $m_{3,4}$ | $m_{1,8}$ | $m_{3,8}$ | $m_{5,8}$ | $m_{7,8}$ |
|---|---|---|---|---|---|---|
| 33 | 18 | 13 | 6 | 11 | 5 | 7 |
| 100001 | 10010 | 01101 | 0110 | 1011 | 0101 | 0111 |

The number of zeros and ones in the last line is 1*6+2*5+ 4*4=32.

From $m_{2i-1,2^k}$, we can restore an estimate for $\hat{\tau}_{2i,2^2k}$ by calculating $$\hat{\tau}_{2i,2^2k} := \text{round}\left(\frac{m_{2i-1,2^k}}{2^{b_k}-1} * (\hat{\tau}_{i,2^k})\right). \quad (2)$$

This recursion is possible, since we store $\tau_{1,1}$ explicitly. The $\hat{\tau}$ are also shown in FIG. 7.

Figure 8:
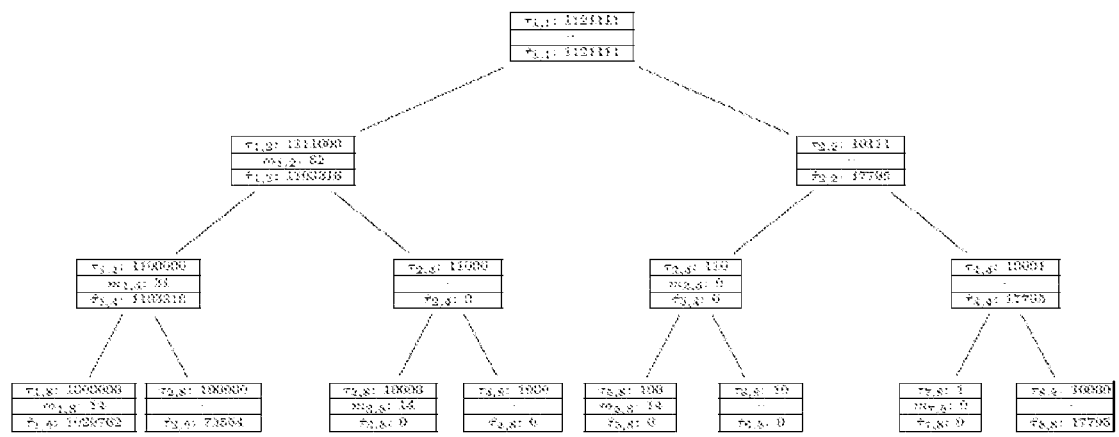

Now, refer to the example shown in FIG. 8. There, it shows a four level tree for a frequency density where the eight bucklets have the following cumulated frequencies:

| $i$ | 1 | 2 | 3 | 4 | 5 | 6 | 7 | 8 |
|---|---|---|---|---|---|---|---|---|
| $f_i^+$ | 1.000.000 | 100.000 | 10.000 | 1000 | 100 | 10 | 1 | 10.000 |

As shown, the error for last bucketlet 8,8 is quite large. The reason is that an estimate of a larger number is subtracted from a smaller number, which is not a good idea. Although, the four level tree is an excellent idea, it has two major problems:

1. Whenever the fraction in Formula 1 is smaller than $1/2^{b_{k+1}}$, rounding takes place towards zero.
2. The left child's $\tau$ is always subtracted from the right child's $\tau$. This results in uncontrollable errors if the right child's $\tau$ is smaller than the left child's $\tau$.

Thus, we propose herein to modify the four level tree. Exploiting the techniques of (binary) q-compression, several variants of the four level tree may be devised. All variants discussed herein use 7 indicator bits to remember whether the left or the right child node contains the smaller $\tau_{i,j}$. The variant FLT2 stores $\tau_{i,j}$ in 11 bits using binary q-compression. For the other $\tau_{i,j}$, the original compression scheme is used. At level 2, 8 instead of 6 bits are used, at level 3, 7 bits instead of 5 bits are used, and at level 4, 6 instead of 4 bits are used.

A variant qFLT herein also stores $\tau_{1,1}$ in 11 bits using binary q-compression. However, instead of deriving the other $\tau_{i,j}$ from estimates of their parents, it directly stores these values in q-compressed form. The number of bits used at each level is the same as in FLT2. The base used is derived from the estimate $\hat{\tau}_{1,1}$ for $\tau_{1,1}$. At level i, the minimal base for the number $\lceil \hat{\tau}_{1,1}/2^{i-1} \rceil$ is chosen.

In some embodiments herein, heterogeneous histograms can be constructed that can contain buckets of several distinct types. The heterogeneous histograms are constructed assuming that all bucket types have the same size. The reason is that having different bucket sizes makes bucket construction much more expensive and difficult. In some instances, even heuristics have high run times and, additionally, waste up to 30% of space. In some embodiments, we further assume that we mainly construct buckets consisting of 8 bucklets.

A heterogeneous histograms with b buckets has three major components:

1. An array of size b+1 containing the bucket boundaries;
2. An array of size b containing one byte bucket headers; and
3. An array of size b consisting of 64 bits per entry containing the bucket's essential data.

If an attribute distribution contains unapproximable parts, QCRaw buckets are used. For this case, we need some additional information (i.e., the distinct values in addition to the compressed frequencies). Further, the histogram contains the number of tuples with NULL-values in the histogram's attribute.

For fast access, an n-ary tree (for some n=128 or similar) summarizing the totals of n buckets or intermediate nodes can optionally be added.

In some embodiments, a construction algorithm for the heterogeneous histogram proceeds in three phases:

I. Determine the bucket boundaries.
II. Determine the bucket types.
III. Determine the bucket's contents.

Figure 9:
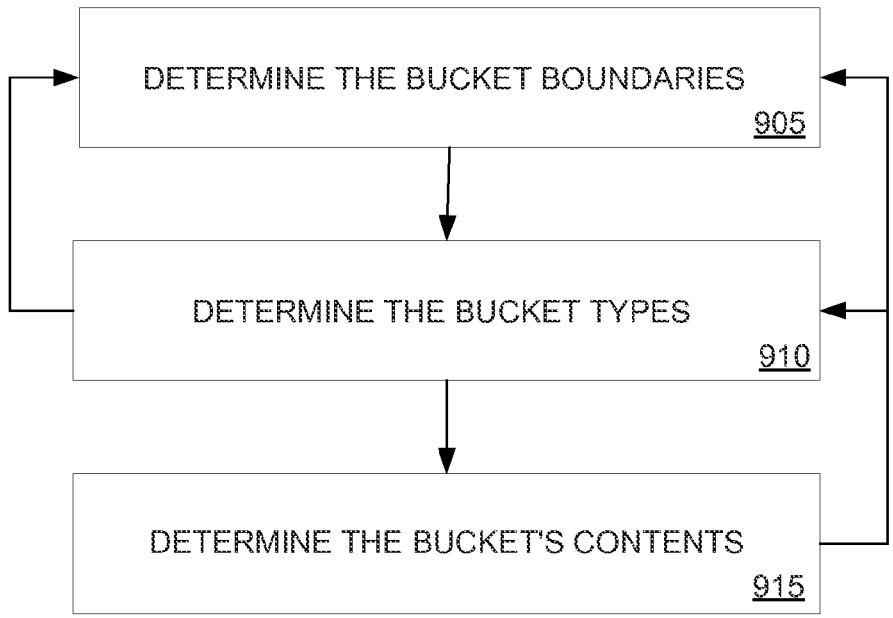
FIG. 9 is a flow diagram, according to some embodiments.

In some aspects, these three phases can be intermingled and need not strictly proceed in a specific order listed above, as illustrated in FIG. 9.

Referring to FIG. 9 at operation 905 (i.e., phase one), process 900 starts with small buckets containing 8 bucklets. Each bucklet contains a single value. The values contained in the initial bucket are the first 8 values of the attribute. Then, the size of the bucket is doubled until the resulting bucket is no longer θ,q-acceptable. It is noted that checking θ, q-acceptability may be, in some respects, the most expensive part of the process. Further, for non-dense buckets, it may happen that even the smallest bucket size is not θ,q-acceptable. If even the smallest bucket size is not θ,q-acceptable, then we simply remember that this is the case. Otherwise, there are two bucket sizes. A smaller one, for a bucket that is θ,q-acceptable and a larger bucket, twice the size of the smaller bucket that is not. A binary search is then performed to find the largest bucket that is still θ,q-acceptable. These operations may be repeated until all the distinct values of the attribute's active domain have been covered. The result will include the bucket boundaries for the histogram.

At operation 905 (i.e., phase two), the histogram is compacted. For every bucket, a determination is made to determine the preferred bucket type among those implemented. In some embodiments, the preferred bucket type chosen is the one that results in the smallest overall q-error for the cumulated frequencies of the eight bucklets. If the initial bucket containing 8 distinct values, one in each bucklet, is not θ,q-acceptable, or the next bucket generated, containing 16 distinct values, two in each bucklet is not approximable, then the process proceeds as follows. If the previous bucket is a:

QCRaw bucket, we extend it appropriately.

QC16×4 bucket, we convert it into a QCRaw bucket and extend it appropriately with the new values of the current bucket.

A bucket containing only 8 distinct values and we need to add 8 distinct values, we convert it into a QC16×4 bucket and extend it appropriately.

Otherwise, if the bucket is dense, the process can use a QC8×8, QC16T8×6, QC8T8×7 bucket. If the bucket is not dense, then a QCRaw bucket is used. The result of this step (II) is the array of bucket types.

At operation 905 (i.e., the third phase), the bucket's contents are generated for every bucket according to its type.

In some embodiments, there are two optional features for the histograms constructed according to the various aspects disclosed herein. These optional features include:

1. Using a tree structure for faster evaluation of histograms; and
2. Including an additional array to store outlier values and their (compressed) frequencies separately.

In some embodiments, outliers may be determined by exceeding the threshold given by the maximum q-compressable value if 4 bits are used. Depending on the base, we may get:

$$\lfloor 2.3^{14} \rfloor = 115.928 \quad \sqrt{2.3*} = 1.52$$
$$\lfloor 2.5^{14} \rfloor = 372.529 \quad \sqrt{2.5} = 1.58$$

Figure 10:
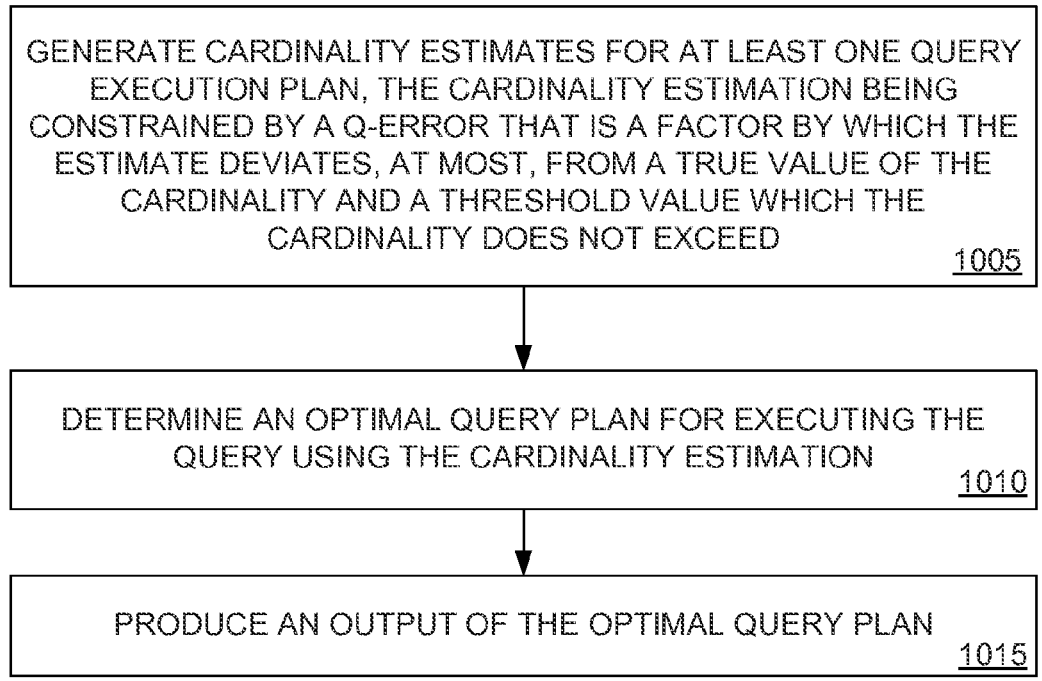
FIG. 10 is a flow diagram illustrating some aspects of embodiments herein.

FIG. 10 is an illustrative flow diagram of a process 1000 according to some embodiments herein. Process may comprise some of the operations and aspects of process 900. In particular, process 1000 highlights aspects of determining the bucket boundaries at operation 1005, including generating cardinality estimates for at least one query execution plan for a query using a histogram. As discussed regarding embodiments herein, the cardinality estimation is constrained by a q-error metric that is a factor by which the estimate deviates, at most, from a true value of the cardinality and a threshold value (i.e., Θ) which the cardinality does not exceed.

At operation 1010, the cardinality estimation determine at operation 1005 is used as the basis for determining an optimal query plan for executing the query. Once determined, the query plan may be output as a file, an instance of a query execution model, or other representations at operation 1015. Thereafter, the query may be executed by a query execution engine.

Figure 11:
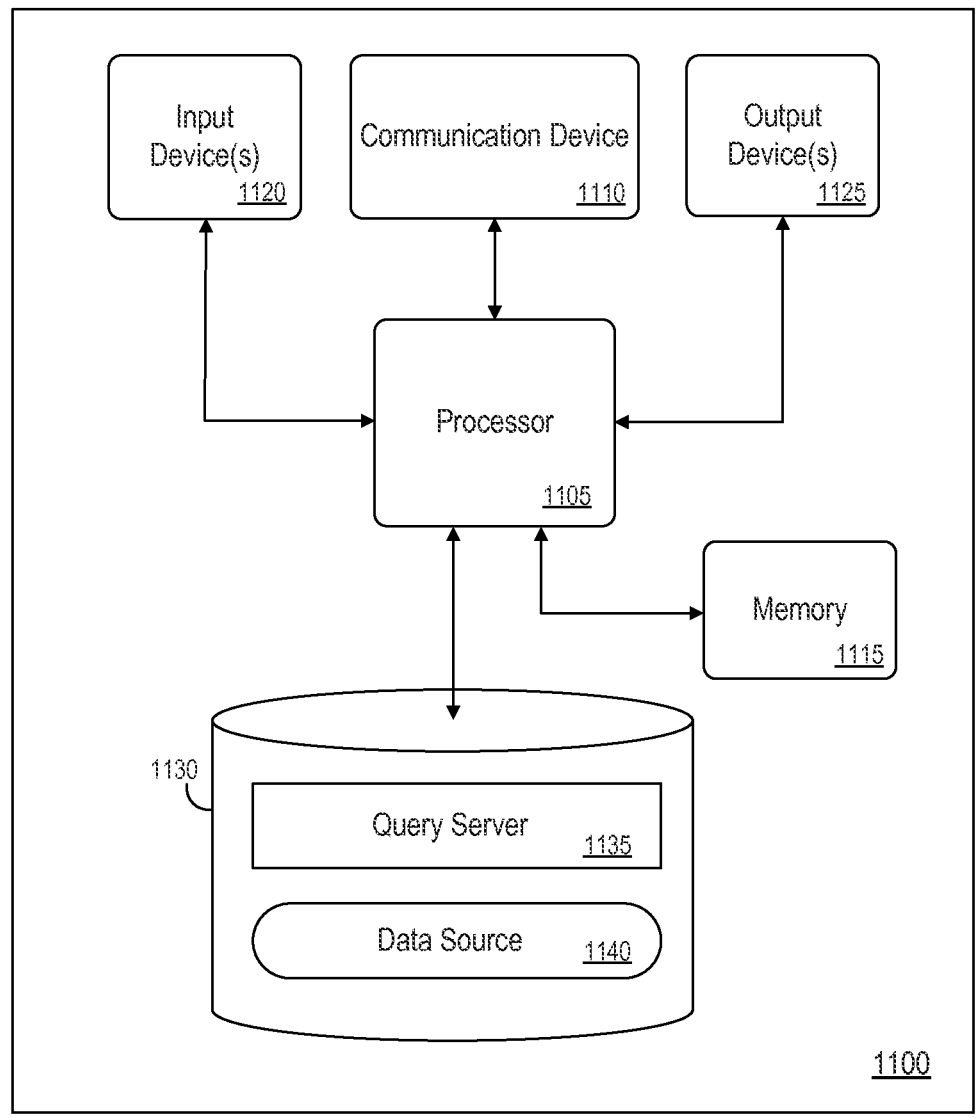
FIG. 11 is an illustrative depiction of an apparatus, according to some embodiments herein.

FIG. 11 is a block diagram of apparatus 1100 according to some embodiments. Apparatus 1100 may comprise a general-purpose computing apparatus and may execute program code or instructions to perform any of the processes described herein. Apparatus 1100 may comprise an implementation of query server 115, comprising an in-memory database. Apparatus 1100 may include other unshown elements according to some embodiments.

Apparatus 1100 includes processor 1105 operatively coupled to communication device 1110, data storage device 1130, one or more input devices 1120, one or more output devices 1125 and memory 1115. Communication device 1110 may facilitate communication with external devices, such as a client device or a data storage device. Input device(s) 1120 may comprise, for example, a keyboard, a keypad, a mouse or other pointing device, a microphone, knob or a switch, an infra-red (IR) port, a docking station, or a touch screen. Input device(s) 1120 may be used, for example, to enter information into apparatus 1100. Output device(s) 1125 may comprise, for example, a display (e.g., a display screen) a speaker, and/or a printer.

Data storage device 1130 may comprise any appropriate persistent storage device, including combinations of magnetic storage devices (e.g., magnetic tape, hard disk drives and flash memory), optical storage devices, Read Only Memory (ROM) devices, etc., while memory 1115 may comprise Random Access Memory (RAM).

Query server 1135 may comprise program code or instructions executed by processor 1105 to cause apparatus 1100 to perform any one or more of the processes described herein. Embodiments are not limited to execution of these processes by a single apparatus. Data source 1140 may implement data source 105 as described above. As also described above, data source 1140 may be implemented in volatile memory. Data storage device 1130 may also store data and other program code for providing additional functionality and/or which are necessary for operation of apparatus 1100, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of system 100 and/or system 1100 may include a processor to execute program code such that the computing device operates as described herein.

All processes mentioned herein may be embodied in processor-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Embodiments have been described herein solely for the purpose of illustration. Persons skilled in the art will recognize from this description that embodiments are not limited to those described, but may be practiced with modifications and alterations limited only by the spirit and scope of the appended claims.

The embodiments described herein are solely for the purpose of illustration. For example, some embodiments may include operation(s) to determine whether a determination of a cardinality estimate in accordance with the various embodiments disclosed herein should be modified and/or performed, at least in part. For example, if an estimate <theta/2, then the estimate may be assumed to be theta/2. This estimation will not overestimate the real value, although in some instances it may underestimate the real value. It has been observed that the maximum error (disregarding theta) is reduced drastically. In some aspects, in addition to the different bucket types, there are further special cases where histogram construction is not useful. Such cases may include, for example, columns with only unique values, when explicit frequencies per value consume less space than the histogram (e.g., when there are few distinct values in a column), etc. Those in the art will recognize other embodiments which may be practiced with modifications and alterations.

What is claimed is:

1. A computer-implemented method of optimizing execution of a query that accesses data by a computer, the method comprising:
generating, by a query server having a processor, cardinality estimates for at least one query execution plan to execute a query using a histogram, the cardinality estimation being constrained by a q-error that is a factor by which the estimate deviates, at most, from a true value of the cardinality and a threshold value which the cardinality does not exceed;
using the generated cardinality estimation that adheres to the q-error and threshold value constraints to determine, by the processor of the query server, an optimal query plan for executing the query; and
producing an output of the optimal query plan.

2. The method of claim 1, wherein the histogram comprises a plurality of buckets, each bucket storing (1) number of distinct values contained in the bucket, and (2) cumulated frequency of the number of distinct values stored.

3. The method of claim 1, wherein the histogram is a heterogeneous histogram.

4. The method of claim 2, wherein each of the plurality of buckets is evaluated to determine whether each bucket adheres to the q-error and threshold value constraints.

5. The method of claim 4, wherein the evaluation is made by using at least one of:
   a pre-test of dense buckets, where a dense bucket has the characteristics of the domain of an attribute represented by the histogram is discrete and every domain value within the bucket has a frequency larger than zero; and
   in an instance the bucket being evaluated is not a dense bucket, at least one of a binary subtest and a test quadratic for the number of distinct values in the bucket being evaluated.

6. The method of claim 4, wherein it is determined that each of the plurality of buckets of the histogram adheres to the q-error and threshold value constraints, then the histogram also adheres to the q-error and a factor of the threshold value constraints.

7. A non-transitory medium having program instructions embodied thereon, the medium comprising:
   instructions to generate cardinality estimates for at least one query execution plan to execute a query using a histogram, the cardinality estimation being constrained by a q-error that is a factor by which the estimate deviates, at most, from a true value of the cardinality and a threshold value which the cardinality does not exceed;
   instructions to use the generated cardinality estimation that adheres to the q-error and threshold value constraints to determine an optimal query plan for executing the query; and
   instructions to produce an output of the optimal query plan.

8. The medium of claim 7, wherein the histogram comprises a plurality of buckets, each bucket storing (1) number of distinct values contained in the bucket, and (2) cumulated frequency of the number of distinct values stored.

9. The medium of claim 7, wherein the histogram is heterogeneous.

10. The medium of claim 8, wherein the medium further comprises instructions to evaluate each of the plurality of buckets to determine whether each bucket adheres to the q-error and threshold value constraints.

11. The medium of claim 10, wherein the medium further comprises, for the evaluation, at least one of:
    instructions to perform a pre-test of dense buckets, where a dense bucket has the characteristics of the domain of an attribute represented by the histogram is discrete and every domain value within the bucket has a frequency larger than zero; and
    instructions to perform, in an instance the bucket being evaluated is not a dense bucket, at least one of a binary sub-test and a test quadratic for a number of distinct values in the bucket being evaluated.

12. The medium of claim 10, wherein it is determined that each of the plurality of buckets of the histogram adheres to the q-error and threshold value constraints then the histogram also adheres to the q-error and a factor of threshold value constraints.

13. A system comprises:
    a computing device comprising:
      a memory storing processor-executable program code; and
      a processor to execute the processor-executable program code in order to cause the computing device to:
      generate cardinality estimates for at least one query execution plan to execute a query using a histogram, the cardinality estimation being constrained by a q-error that is a factor by which the estimate deviates, at most, from a true value of the cardinality and a threshold value which the cardinality does not exceed;
      use the generated cardinality estimation that adheres to the q-error and threshold value constraints to determine an optimal query plan for executing the query; and
      produce an output of the optimal query plan.

14. The system of claim 13, wherein the histogram comprises a plurality of buckets, each bucket storing (1) number of distinct values contained in the bucket, and (2) cumulated frequency of the number of distinct values stored.

15. The system of claim 13, wherein the histogram is a heterogeneous histogram.

16. The system of claim 14, wherein each of the plurality of buckets is evaluated to determine whether each bucket adheres to the q-error and threshold value constraints.

17. The system of claim 16, wherein the evaluation is made by using at least one of:
    a pre-test of dense buckets, where a dense bucket has the characteristics of the domain of an attribute represented by the histogram is discrete and every domain value within the bucket has a frequency larger than zero; and
    in an instance the bucket being evaluated is not a dense bucket, at least one of a binary sub-test and a test quadratic for the number of distinct values in the bucket being evaluated.

18. The system of claim 16, wherein it is determined that each of the plurality of buckets of the histogram adheres to the q-error and threshold value constraints then the histogram also adheres to the q-error and a factor of threshold value constraints.

* * * * *